(No Model.) 2 Sheets—Sheet 1.

W. L. SILVEY.
SECONDARY BATTERY.

No. 540,076. Patented May 28, 1895.

Attest:
E. B. Lehman
E. K. Kirby

Inventor.
William L. Silvey

THE NORRIS PETERS CO., PHOTO-LITHO., WASHINGTON, D. C.

(No Model.)  W. L. SILVEY.  2 Sheets—Sheet 2.
SECONDARY BATTERY.
No. 540,076.  Patented May 28, 1895.
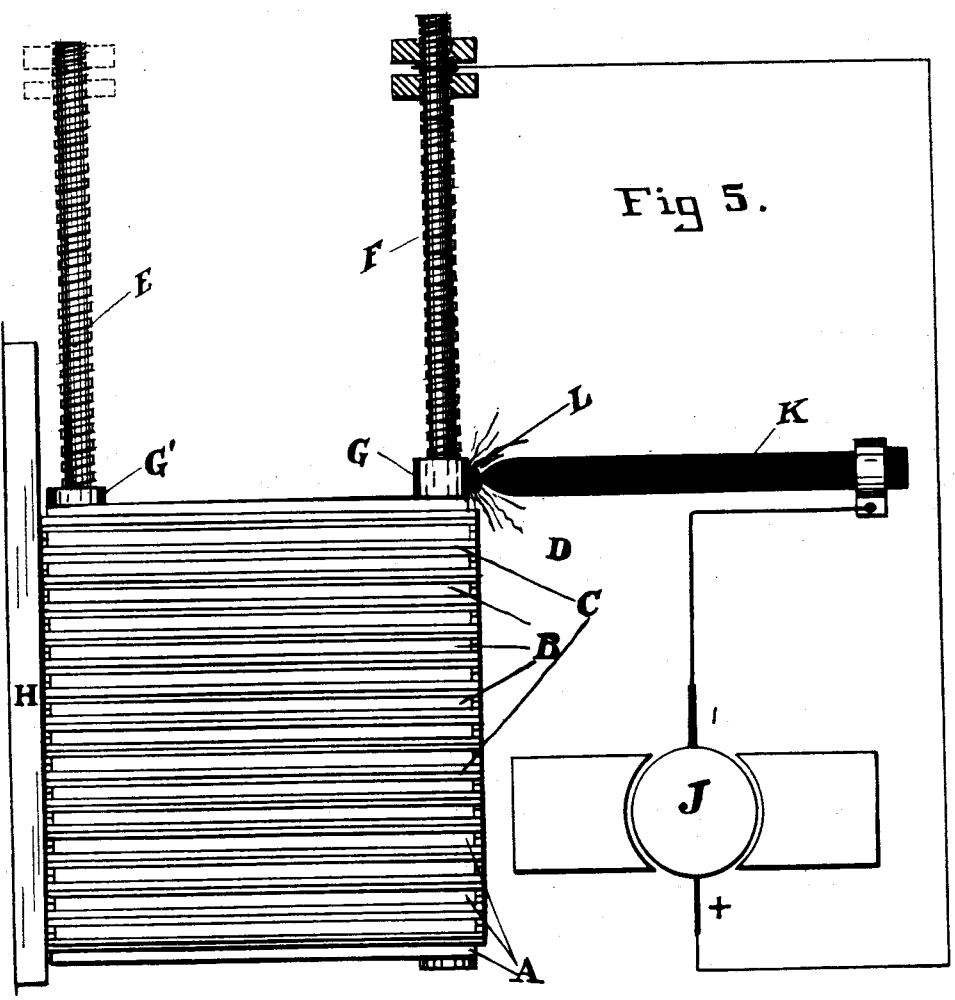
Attest;
E. B. Lehman
E. K. Kirby
Inventor.
William L. Silvey

UNITED STATES PATENT OFFICE.

WILLIAM L. SILVEY, OF DAYTON, OHIO.

SECONDARY BATTERY.

SPECIFICATION forming part of Letters Patent No. 540,076, dated May 28, 1895.

Application filed January 21, 1895. Serial No. 535,645. (No model.)

*To all whom it may concern:*

Be it known that I, WILLIAM L. SILVEY, a citizen of the United States, and a resident of Dayton, in the county of Montgomery and State of Ohio, have invented certain new and useful Improvements in Secondary Batteries, of which the following is a specification.

My invention relates to certain new and useful arrangements of the battery electrodes whereby the respective positive and negative electrodes are more perfectly isolated from each other and to my new method whereby the respective electrodes are more thoroughly united together mechanically and electrically, and whereby new and useful electrical results are obtained.

Figure 2:
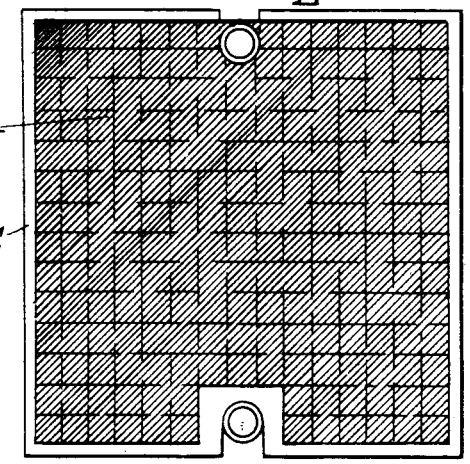
Figure 1:
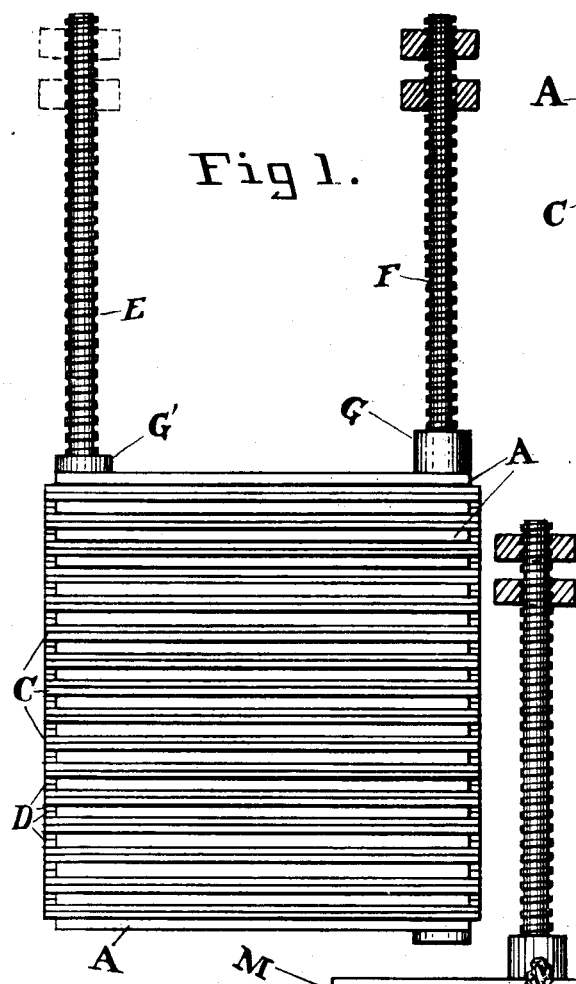
Figure 4:
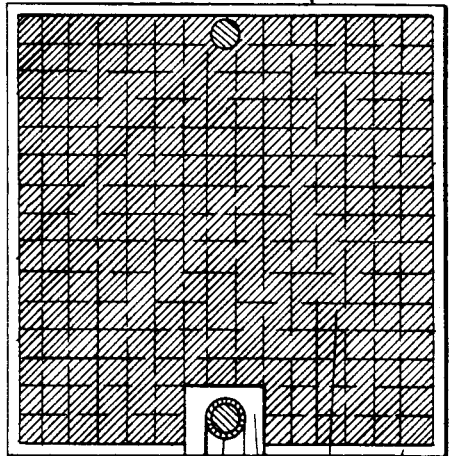
Figure 3:
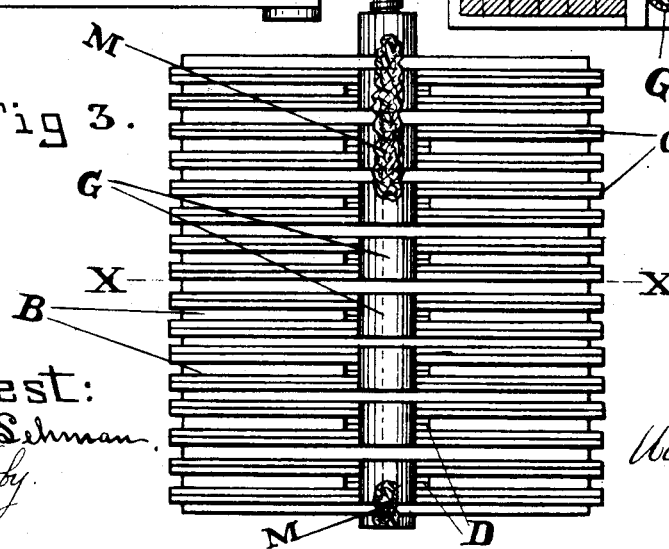

Referring to the accompanying drawings, which are made a part hereof, in which similar letters of reference refer to similar parts throughout, Figure 1 is an end elevation of one of my improved batteries. Fig. 2 is a top or plan view of the same. Fig. 3 is an end view of a completed battery. Fig. 4 is a view of Fig. 3 along the horizontal dotted line X X. Fig. 5 is a graphic view of my improved process for uniting my battery-electrodes together, and Fig. 6 represents my improved separator heretofore and hereinafter mentioned.

An examination of my drawings will in a sense disclose a general idea as to the mechanical construction as carried out in preparing my improved battery.

It will be observed that in the construction of my battery I place both my positive and negative battery plates A B horizontal with relation to each other with sheets of porous and absorbent fabric C such as wood, board, asbestos or cloth, covering the faces of the battery plates and whereby they are maintained equidistant. The plates of the respective electrodes are united together and to connecting rods E, F by means of suitable distance pieces, nuts or collars G G' placed between the respective plates of each electrode.

It will be observed by examining Fig. 2 that the battery plates are provided with a notch through which the rod of the other electrode passes but without coming in contact. The plates are additionally prevented from coming in contact with the connecting rod and distance piece or collar of the other electrode. This additional separating device consists of a porous material D placed in the notch in the battery plate, which, in order to be of the proper thickness, I have found advisable to make of two thicknesses on account of flexibility. There are cases in which large cells are employed where it may be found advisable to make both the large and small separators C D of more than two thicknesses, but this is not material to the invention as any number of thicknesses may be used as practice proves most convenient.

It will be observed that the small separator is of a U shape in order more readily to fill the openings in the battery plates and to compensate for irregularity of the metal battery plates. Another reason for making the separator U shaped is to permit the gases which are generated to readily escape and to allow a free vertical channel for the gases along the battery rods or connectors E F, and between them and the containing jar or cell not shown.

The battery plates having been properly assembled by being placed horizontally and alternately on each other with sheets of porous separating material C between each plate and the separators D placed in the notches and surrounding the nuts or collars G G' by which the battery plates are connected to the respective battery posts E F, of the two electrodes, I now place my battery with the battery posts E F placed horizontally on a suitable table or platen H, connect the battery post F with one of the conductors of a suitable electric supply J, as for instance a dynamo electric machine, and connect the other electric conductor of the electric supply with a carbon rod K or other suitable material. This preliminary operation being accomplished I bring the carbon rod in contact with the battery nut, collar or plate of the battery electrode, then withdraw the rod enough to establish an arc L whereby the metal of the nut or plate is immediately brought to a state of fusion and the carbon being slowly moved along the length of the rod the connectors, the lower head of the battery post, as well as the nuts G and plates A are immediately fused into a thorough unyielding and perfect metallic union as shown in a partially welded cell at M in Fig. 3.

I have found in practice that a battery made according to my plan, but which had not been welded, would in the course of a few months become oxidized in the joints between the nuts G G', the plates A B and the posts E F whereby many of the plates would become practically inactive and useless and the storage capacity greatly impaired but by removing the element from the jar and welding the element together the original power of the cell was at once restored. In this welding operation it is not necessary to employ solder in any form as the metal (lead) is merely fused together in a line along the outer edge of the nut as shown at M in Fig. 3. No soldering solution is required to remove the oxides as is usually employed in soldering. In fact it is better to simply fuse the metal of the electrode without any previous preparation as the lead oxides are burned off by the powerful electric arc L which is established, and the part thus fused together is left clean, bright, and the contact is absolutely perfect.

In practice I have found that a rod of carbon K is most useful, as the negative element, and the battery electrode as the positive element while welding, for the reason that better and cleaner work is done, besides the work is done more rapidly than it is possible by any method which I have found up to the present time. By making the battery electrode the positive element in the electric circuit the metal becomes elevated to a very high temperature and fuses more rapidly and the metallic oxides which are always present on the surface of lead are more readily burned off and the welding performed much more expediently than if the battery electrode had been made the negative in the electric circuit. By making the negative element K a carbon rod a very high degree of heat is produced without any deleterious deposits on the battery electrode, besides the metallic oxides are more readily eliminated and few gases are given off which might be injurious to the workman. A rod of metal, such as iron, copper, lead, &c., might be substituted for the carbon rod K, but the work performed would be unsatisfactory and it would be almost impossible to perform the welding without making the part welded of a porous nature, which in welding storage batteries is always to be avoided.

Having fully described my invention, what I claim as new, and wish to secure by Letters Patent of the United States, is—

1. In a secondary battery the combination with the battery plates having recesses of a porous medium separating the plates, and a porous separating medium occupying the recesses in the battery plates, whereby each battery plate of one electrode is prevented from coming in contact with the other electrode.

2. In a secondary battery the combination of the battery plates A B, porous plates C, battery rods E F, the nuts or collars G G', with porous plates D occupying notches in the battery plates and surrounding the battery posts and collars G and whereby the collars and battery posts of one electrode are prevented from coming in contact with the battery plates of the other electrode.

3. In a secondary battery a separator for the electrodes consisting of a piece adapted to be placed in a notch in the battery plate of an electrode and whereby the plate of one electrode is prevented from coming in contact with the connecting rod or bar of the other electrode, the separator provided on its outer edge with a passage way for the escape of the gases generated in the battery as set forth.

4. In a secondary battery the combination of a screw threaded battery connector or post, battery plates and battery collars, the battery post passing through the plates and collars porous plates surrounding the collars porous sheets between the battery plates, the collars, plates and post connected together by a welded strip as set forth.

WILLIAM L. SILVEY.

Witnesses:
H. EMMONS, Jr.,
HENRY LEIDENGER.